United States Patent
Reddy K et al.

(10) Patent No.: US 12,322,179 B2
(45) Date of Patent: Jun. 3, 2025

(54) AUTOMATIC PROFILE PICTURE UPDATES

(71) Applicant: Microsoft Technology Licensing, LLC, Redmond, WA (US)

(72) Inventors: Pradeep Kumar Reddy K, Hyderabad (IN); Bhavesh Sharma, Hyderabad (IN); Rahul Gupta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 489 days.

(21) Appl. No.: 17/234,265

(22) Filed: Apr. 19, 2021

(65) Prior Publication Data
US 2022/0335244 A1     Oct. 20, 2022

(51) Int. Cl.
*G06V 20/40* (2022.01)
*G06F 18/21* (2023.01)
*G06F 18/40* (2023.01)
*G06N 20/00* (2019.01)

(52) U.S. Cl.
CPC .......... *G06V 20/46* (2022.01); *G06F 18/2178* (2023.01); *G06F 18/41* (2023.01); *G06N 20/00* (2019.01)

(58) Field of Classification Search
CPC .... H04N 21/466; H04N 7/163; G06F 16/437; G06F 65/60
See application file for complete search history.

(56) References Cited

U.S. PATENT DOCUMENTS

| | | | | |
|---|---|---|---|---|
| 7,502,496 | B2 * | 3/2009 | Kozakaya | G06V 40/161 382/118 |
| 7,550,707 | B2 * | 6/2009 | Hashimoto | G06V 10/10 250/221 |
| 7,813,822 | B1 * | 10/2010 | Hoffberg | H04N 7/163 381/73.1 |
| 7,925,605 | B1 * | 4/2011 | Rubin | G06N 5/025 706/47 |
| 7,991,193 | B2 * | 8/2011 | Hampapur | G06V 20/53 382/103 |
| 8,003,889 | B2 * | 8/2011 | Turcovsky | H02G 3/0481 52/99 |
| 8,063,889 | B2 * | 11/2011 | Anderson | G07F 19/207 345/173 |
| 8,111,281 | B2 * | 2/2012 | Sangberg | H04L 65/1083 348/14.1 |
| 8,179,370 | B1 * | 5/2012 | Yamasani | G06F 3/0237 345/169 |
| 8,335,353 | B2 * | 12/2012 | Yamamoto | G02B 6/0055 340/5.83 |
| 8,352,400 | B2 * | 1/2013 | Hoffberg | G06F 7/023 706/46 |
| 8,385,883 | B2 * | 2/2013 | Rajan | H04W 12/082 340/5.31 |

(Continued)

*Primary Examiner* — Yosef Kassa
(74) *Attorney, Agent, or Firm* — RAY QUINNEY & NEBEKER P.C.; Paul N. Taylor

(57) ABSTRACT

A user's profile picture is updated from a live video stream. A profile updater analyzes the still images that make up the live video stream and identifies one or more target characteristics of a subject in the still images. Using the target characteristics, one or more still images are selected for use as the updated profile picture. The user provides feedback regarding the selected images, which is used to refine the still image selection.

23 Claims, 9 Drawing Sheets

(56) References Cited

U.S. PATENT DOCUMENTS

| | | | | |
|---|---|---|---|---|
| 8,498,454 | B2 * | 7/2013 | Tu | G06V 40/172 |
| | | | | 382/209 |
| 8,533,199 | B2 * | 9/2013 | Malla | G06F 40/169 |
| | | | | 707/741 |
| 8,614,676 | B2 * | 12/2013 | Chiang | G06F 3/015 |
| | | | | 455/414.4 |
| 8,621,345 | B2 * | 12/2013 | Selby | G06F 21/31 |
| | | | | 715/271 |
| 8,624,952 | B2 * | 1/2014 | Currivan | H04N 7/14 |
| | | | | 348/14.02 |
| 8,763,020 | B2 * | 6/2014 | Toebes | H04N 21/466 |
| | | | | 725/16 |
| 8,854,553 | B2 * | 10/2014 | Chavez | H04N 7/0122 |
| | | | | 348/580 |
| 9,338,622 | B2 * | 5/2016 | Bjontegard | A63F 13/216 |
| 9,418,375 | B1 * | 8/2016 | Cunico | G06F 16/36 |
| 9,705,998 | B2 * | 7/2017 | Krishnaswamy | H04W 4/21 |
| 9,760,935 | B2 * | 9/2017 | Aarabi | G06Q 30/06 |
| 9,836,455 | B2 * | 12/2017 | Martens | G06F 40/279 |
| 10,116,850 | B2 * | 10/2018 | Kandur Raja | G06F 1/1605 |
| 10,516,564 | B2 * | 12/2019 | Park | H04L 41/026 |

* cited by examiner

AUTOMATIC PROFILE PICTURE UPDATES

CROSS-REFERENCE TO RELATED APPLICATIONS

N/A.

BACKGROUND

Many business, communication, media, social media, and other platforms allow a user to generate a virtual profile. The virtual profile may include a variety of different information about the user, including personal information, contact information, biographical information, job history, education history, interests, goals, any other information, and combinations thereof. Many platforms allow a user to upload a profile picture of him or herself. A profile picture allows those that interact with the user through the platform to visualize him or her. This visualization may increase the connection between the user and those with whom he or she interacts.

BRIEF SUMMARY

Enterprise users may have a significant number of online interactions, from emails and instant messages to meetings and voice calls. As discussed above, many companies and platforms allow users to use profile pictures to help personalize these online interactions. However, often a user will select a profile picture once, e.g., when they start at a company, and not update it again. Thus, there is a growing disconnect over time between the user and their profile picture. The present disclosure describes systems and methods for updating a user's profile picture in an automated manner that reduces the time and effort required by the user to keep their profile picture up to date.

In some embodiments, a method for updating a profile picture includes analyzing a plurality of still images from the video feed. One or more target characteristics are identified in the plurality of still images. Using the one or more target images, at least one still image is selected and the user's profile picture is updated by replacing it using the at least one selected still image. In some embodiments, the user's profile picture is updated only if a threshold period of time has passed between profile picture updates. In some embodiments, a machine learning model is trained to analyze the still images from the video feed. The machine learning model is trained for the user using user feedback from the selected still images.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 3-1 and FIG. 3-2 are representations of a video feed analysis of a live video feed, according to at least one embodiment of the present disclosure;

FIG. 4-1 and FIG. 4-2 are representations of a machine learning model, according to at least one embodiment of the present disclosure;

DETAILED DESCRIPTION

Figure 1:
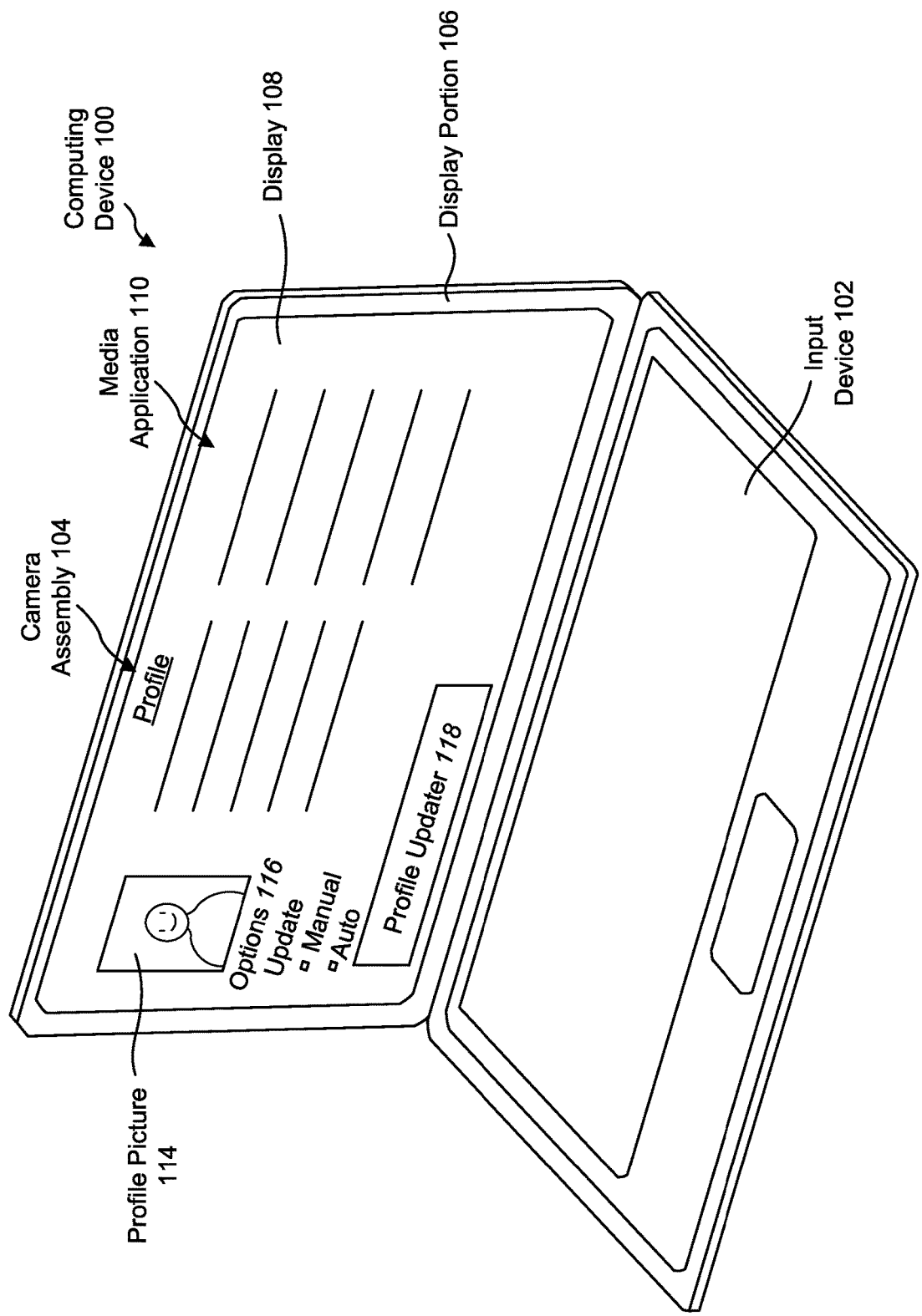
FIG. 1 is a representation of a computing device, according to at least one embodiment of the present disclosure.

This disclosure generally relates to devices, systems, and methods for updating a user's profile picture, e.g., using still images collected from a live video stream. The live video stream may be a video stream of a live video conference call. A profile updater may analyze the video stream to identify target characteristics in the still images. Using the target characteristics, the profile updater may select one or more of the still images to update the user's profile picture. This may allow the user to maintain an updated profile picture without having to manually capture pictures and upload them. An updated profile picture may help the user to better relate with and interact with his or her contacts.

In accordance with embodiments of the present disclosure, the profile updater checks a user's profile to see when the user's profile picture was last updated. If the user's profile picture has not been updated recently (e.g., within a timeout period of 1 month, 6 months, 1 year, etc.), then the profile updater may automatically initiate updating the user's profile picture. In this manner, the user may update their profile picture more often, which may lead to better in-person recognition and/or better connection from those among whom he or she associates.

In accordance with embodiments of the present disclosure, the profile updater compares a user's current features with the user's features in their profile picture. If the user's current features or hair are different from the profile picture, than the profile updater may automatically initiate updating the user's profile picture. In this manner, the profile picture is updated (e.g., replaced) to capture new hair styles, hair colors, surgical changes (e.g., eye surgery to remove the need for glasses), and the like.

In some embodiments, the profile updater includes a machine learning model may be trained to better identify still images within a live video feed. The machine learning model may be initially trained to identify still images that are generally favorable to a variety of users based on a generic set of target characteristics. The profile updater may present the user with a list of still images pulled from the live video feed. The user may select his or her favorite image from the list for the updated profile picture. The machine learning model may be updated with the selected favorite image. The target characteristics of the machine learning model may then be updated based on the difference in characteristics between the selected favorite image and the unselected images. When it is time to provide a new profile picture, the machine learning model may select new images that are based on the updated target characteristics. In this manner, over time, the user may be presented with images that more closely meet his or her preferences. In some embodiments, the machine learning model automatically updates the user's profile picture without input from the user.

Through training with a particular user, the machine learning model may begin to identify differences in appearance between video feeds from a user. For example, the machine learning model may identify changes in physical appearance and replace the user's profile picture with a new picture reflecting the changed appearance. The machine learning model may ask the user if he or she would like to replace the profile picture to reflect the change in an aspect of the user's physical appearance. In some embodiments, the physical appearance aspect is any physical appearance aspect, such as a haircut, hair color, hair style, beard style (including clean shaven), eyewear style, removal of eyewear, weight loss, weight gain, clothing style (e.g., the presence of formal wear), addition/removal of orthodontics, any other physical appearance aspect, and combinations thereof.

Many modern computing devices allow a user to video conference with other users. In a video conference, a live stream of a video is transmitted from one location to another. Many people best connect with others when they have a visual representation of that person in their head. Video conferencing allows two people to build and/or maintain connections, even if they are located remotely from each other. Furthermore, many media platforms which facilitate video conferencing may allow a user to create a user profile. The user profile may include a profile picture of the user. Conventionally, the user may need to manually upload and/or update his or her profile picture. Many users forget or do not want to spend time uploading/updating their profile picture. This may result in profile pictures that are out of date. As video conferencing becomes more prevalent, it may quickly become apparent if the user's current likeness does not match the image in the profile picture. This disconnect between the user's current image and the profile picture may reduce the quality of the user's connection with others.

FIG. 1 is a representation of a computing device 100, according to at least one embodiment of the present disclosure. The computing device 100 shown includes an input device 102, such as a keyboard, a mouse, a track pad, any other input device, and combinations thereof. The computing device 100 may include a camera assembly 104 on a display portion 106. The display portion 106 may include a display 108. A media application 110 is displayed on the display 108.

The media application 110 shown includes a user profile 112. The user profile 112 includes information about the user, including a profile picture 114. The user profile 112 may further include options 116 for the user, including options to grant an opt-in permission or opt-out (e.g., deny permission) of profile updating. For example, in the embodiment shown, the options 116 include an option to manually update the profile picture and automatically update the profile picture.

Many modern computing devices allow a user to video conference with other users. In a video conference, a live stream of a video is transmitted from one location to another. Many people best connect with others when they have a visual representation of that person in their head. Video conferencing allows two people to build and/or maintain connections, even if they are located remotely from each other. Furthermore, many media platforms which facilitate video conferencing may allow a user to create a user profile. The user profile may include a profile picture of the user. Conventionally, the user may need to manually upload and/or update his or her profile picture. Many users forget or do not want to spend time uploading/updating their profile picture. This may result in profile pictures that are out of date. As video conferencing becomes more prevalent, it may quickly become apparent if the user's current likeness does not match the image in the profile picture. This disconnect between the user's current image and the profile picture may reduce the quality of the user's connection with others.

In accordance with embodiments of the present disclosure, a media application includes a profile updater. A media application may be any application that facilitates live video recording, live video conferencing, any other use or manipulation of live video, and combinations thereof. For example, a media application may include a social media application, a messaging application, a video conferencing application, any other type of media application, and combinations thereof. In some embodiments, the profile updater is a native part of the media application. In some embodiments, the profile updater is an add-on to the media application.

The media application 110 shown is in communication with the camera assembly 104. When the user begins a video conference, the media application 110 receives a live video feed from the camera assembly 104. A profile updater 118 in communication with the media application 110 and analyzes the still images (e.g., the individual frames) that make up the live video feed. The profile updater 118 searches each image from the live video feed for target characteristics. Based on the identified target characteristics, the profile updater 118 then selects one or more still images as candidates for an updated profile picture. The profile updater 118 presents the still images to the user, and the user then chooses one of the still images as an updated profile picture 114. In some embodiments, the profile updater 118 replaces an existing profile picture with the updated profile picture 114. In some embodiments, the profile updater 118 notices that there is no profile picture 114 present, and the profile updater 118 updates the profile picture 114 by uploading an initial profile picture. In this manner, updating the profile picture 114 may include replacing the profile picture 114 and/or uploading a new profile picture 114 to the user's profile.

In some embodiments, the profile updater has access to the camera of a computing device. The profile updater may receive the video feed from the camera. As may be understood, a video feed consists of a series of still images (e.g., frames or individual frames) displayed in rapid succession. The profile updater includes an image analyzer. The image analyzer may analyze the frames from the video feed for one or more target characteristics. The target characteristics may be any type of image characteristic. In some embodiments, the target characteristics include one or more image quality features, such as image blurriness, exposure, shadowing, lighting and shadows, camera angle, and so forth. In some embodiments, the target characteristics include background and/or foreground information. For example, the image analyzer may determine whether a portion of an image is in the background or the foreground (e.g., is part of the user). In some embodiments, the target characteristics include bodily information about the user. For example, the image analyzer may determine whether portions of a user's body are fully visible, such as the user's ears, eyes, nose, hair, chin, shoulders, arms, hands, legs, torso, any other portion of the user's body, and combinations thereof. In some embodiments, the target characteristics include information about a particular portion of the user's body. For example, the target characteristics may include whether a user is smiling, how much of a user's teeth are showing, whether a user's eyes are open, whether the user's hand is near his or her face, the user's body posture, and so forth. In some embodiments, the image analyzer analyzes any combination of image characteristics.

In some embodiments, the profile updater 118 analyzes the profile picture 114 and determines if the profile picture 114 has been updated within a threshold period of time, such as one week, two weeks, four weeks, one month, two months, three months, six months, one year, and so forth. If the profile picture 114 has not been updated within the threshold period of time, then the profile updater 118 may prepare an updated profile picture 114, as discussed herein.

As discussed herein, the profile updater may analyze a live video feed. A live video feed is a video feed in which the user is interacting with another individual over the Internet. In some situations, the user interacts with the other individual in real time. In some embodiments, the elements of the profile updater, including the image analyzer, the image selection manager, the update manager, any other portions of the profile updater, and combinations thereof, analyze the live video feed in real time. Put another way, the live video feed may be analyzed in real time. For example, the image analyzer may analyze an image captured by the camera as soon as it is captured, or within an analysis period after capture. The analysis period may be 16 ms, 20 ms, 25 ms, 50 ms, 75 ms, 100 ms, 150 ms, 200 ms, 250 ms, 300 ms, 350 ms, 400 ms, 450 ms, 500 ms, 600 ms, 700 ms, 800 ms, 900 ms, 1000 ms, 5 s, 10 s, 15 s, 30 s, 1 min, 5 min, 10 min, 15 min, 30 min, 1 hour, or any value therebetween.

In some embodiments, the image analyzer analyzes the image before the image is presented to the user and/or transmitted as part of the video conference. In some embodiments, the image analyzer analyzes the image after the image is presented to the user and/or transmitted as part of the video conference. This may help to prevent and/or reduce delays in the processing and transmitting of the live video feed. While embodiments of the present disclosure discuss the use of a live video feed, it should be understood that the principles of the present disclosure may be applied to a pre-recorded video feed. For example, a video conference may be recorded, and the profile updater may be applied to a previously recorded video conference. In some embodiments, still images from the video conference are stored in a memory cache of the profile updater. After the profile updater has completed updating the user's profile, the cache may be wiped to reduce the memory requirements of the profile updater.

Utilizing a live video feed may help the profile updater to collect candid images of the user. As used herein, a candid image of the user is an image that is not pre-scripted or linked to other media. Put another way, a candid image is independent of other media content and/or other pre-recorded media. This may help to collect genuine expressions of the user. Many people react positively to genuine expressions, and collecting candid images from a live video feed may help to prepare positive images with genuine expressions.

Figure 2:
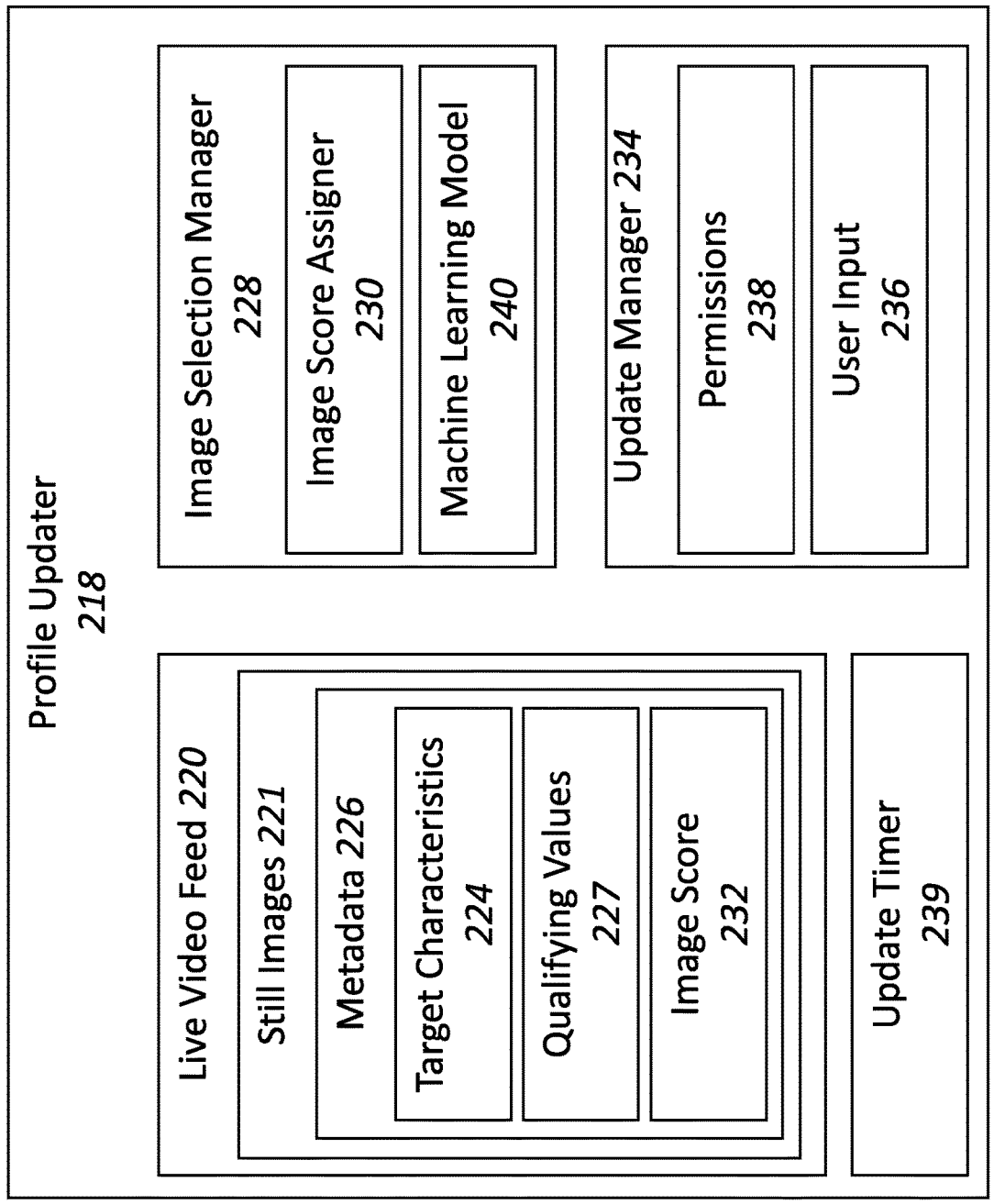
FIG. 2 is a representation of a profile updater, according to at least one embodiment of the present disclosure.

FIG. 2 is a representation of a profile updater 218, according to at least one embodiment of the present disclosure. In accordance with embodiments of the present disclosure, the profile updater 218 is implemented on the media application 110 of FIG. 1. Put another way, the media application 110 of FIG. 1 may implement the profile updater 218 of FIG. 2. The profile updater 218 shown receives a live video feed 220 from a camera (e.g., the camera 104 of FIG. 1). The live video feed 220 includes a plurality of still images 221. The still images 221, when displayed sequentially, make up the live video feed 220.

An image analyzer 222 analyzes the still images 221 for one or more target characteristics 224. The target characteristics 224 may include any target characteristic 224 discussed herein, including facial properties, organ visibility, background properties, background distinction from the foreground, and body properties. The image analyzer 222 identifies the target characteristics 224 in each still image 221. In some embodiments, the image analyzer 222 edits image data 226 associated with the still images 221 with the target characteristics 224. In some embodiments, the image analyzer 222 assigns a qualifying value 227 to each target characteristic 224 identified in the still images 221. The qualifying value 227 may be recorded in the image data 226.

In some embodiments, a target characteristic includes a qualifying value. For example, the target characteristic of whether a user's eyes are open may include a value relating the percentage the user's eyes are open. In some examples, the target characteristic of whether a user is smiling may include a value relating to the extent of the smile. In some examples, the target characteristic of whether the user is shadowed (e.g., shadow presence) may include a value of the shadow contrast and/or the shadow location. As may be seen, each of the target characteristics may include a qualifying value that is associated with the target characteristic.

In some embodiments, the target characteristic and/or any qualifying values associated with that target characteristic are assigned to the still image's image data. In some embodiments, the still image's image data is stored in a metadata file associated with the still image. For example, the target characteristic and/or qualifying values may be appended on an image data file, or data file associated with the still image. Assigning the target characteristic and/or qualifying values to image data may help the profile updater to manage the target characteristics. This may reduce the amount of time and/or processing used by the image selection manager to analyze the target characteristics and/or the qualifying values and assign the still image an image score.

During a video feed, the image analyzer may process the still images that form the video feed. In some embodiments, the image analyzer analyzes each still image of the video feed. In some embodiments, the image analyzer does not analyze each still image in the video feed. In some embodiments, the image analyzer analyzes selected still images in a pattern. For example, the image analyzer may analyze every other still image, every third still image, every fourth still image, every fifth still image, every sixth still image, and so forth. In some embodiments, the image analyzer analyzes an image periodically. For example, the image analyzer may analyze a still image every 16 ms, 20 ms, 25 ms, 50 ms, 75 ms, 100 ms, 150 ms, 200 ms, 250 ms, 300 ms, 350 ms, 400 ms, 450 ms, 500 ms, 600 ms, 700 ms, 800 ms, 900 ms, 1000 ms, or any value therebetween. In some embodiments, the image analyzer analyzes the still images of the video feed using one or more of a pattern, a period, any other mechanism, and combinations thereof.

An image selection manager 228 analyzes each of the still images 221. In some embodiments, the image selection manager 228 analyzes the image data 226 associated with each still image 221. Based on the target characteristics 224 identified in each still image 221 and/or the qualifying values 227, an image score assigner 230 assigns each still image 221 an image score 232. Using the image score 232, the image selection manager 228 selects one or more of the still images 221 as a potential updated profile picture.

The profile updater may further include an image selection manager. The image selection manager select still images from the video feed using the analyzed target characteristics. To select the images, the image selection manager may use the target characteristics identified in the images by the image analyzer. In some embodiments, the image selection manager collects the target characteristics and/or any qualifying values from the still image's image data. The image selection manager may include an image score assigner, which may assign each still image an image score based on the identified target characteristics. The image score may take into account the qualifying value of one or more target characteristics of the image. For the purposes of this disclosure, a high score may be associated with a more desirable or a more highly favored image, while a low score may be associated with a less desirable or less favored image. However, it should be understood that the score is somewhat arbitrary, and a low score may be associated with a better image and a high score may be associated with a worse image, depending on how the score is determined. In some embodiments, the image selection manager records the image score in the still image's image data. For example, after determining an image score, the image selection manager may modify the still image's image data to include the image score. In some embodiments, after the live video feed has ended, the image selection manager searches the image data of each image to identify the still images having the largest image score.

In some circumstances, a target characteristic may have a strong enough weight that that characteristic alone can lower the image score to below a selection threshold. For example, if all of the user's facial features are not visible, the image score may be below the selection threshold. In some examples, if the user's hands, arms, feet, or other non-head and shoulders portion of the user are visible in the image, then the image score may be below the selection threshold. In some examples, if the blurriness is high, then the image score may be below the selection threshold. In some examples, if the background is indistinguishable from the foreground, then the image score may be below the selection threshold. In some examples, if another person is detected in the background, then the image score may be below the selection threshold. In some embodiments, the user is able to select target characteristics that can automatically drop the image score below the selection threshold.

In some embodiments, the image score is calculated using the target characteristics. Each target characteristic may include a weight. A target characteristic having a heavier weight may have a larger impact on the image score than a target characteristic having a lighter weight. For example, the blurriness of an image may have a larger impact on the image score than the extent of the user's smile. In some examples, whether the user's eyes are open may have a larger impact on the image score than the angle of the user's head. In some embodiments, the weight of each target characteristic is assigned by the profile updater. In some embodiments, the user is able to change the weight of certain target characteristics. For example, the user may prefer pictures with a closed-mouth smile. The user may indicate this preference in the permission or other profile settings. When the image selection manager is reviewing each still image, the image selection manager may assign the target characteristic of a closed mouth a higher weight. This may help to provide the user with potential profile pictures that are in line with his or her preferences.

In the embodiment shown, an update manager 234 updates the profile picture with the updated profile picture. In some embodiments, the update manager 234 queries the user for user input 236 regarding the images selected by the image selection manager 228. In some embodiments, the update manager 234 presents the user with several of the selected still images 221 and requests that the user chooses (e.g., requests user input 236) which of the selected still images 221 he or she would like to use for the updated profile picture. In some embodiments, the update manager 234 updates the profile picture with the selected still image 221, such as the still image having the highest image score 232.

In some embodiments, prior to updating the profile picture, the update manager checks for one or more permissions 238. As discussed herein, the permissions 238 include permissions from the user, permissions from the media application, permissions from the domain or network administrator, any other permissions, and combinations thereof. In some embodiments, the permissions 238 include permissions to automatically update the user's profile picture and/or permission to provide the user with an option of multiple selected still images 221 to choose from.

In some embodiments, the profile updater 218 includes an update timer 339. The update time 339 keeps track of the last time that the user's profile picture was updated. If the user's profile picture was last updated after a threshold period of time, the update time 339 may request and/or instruct the profile updater 218 to prepare an update for the user's profile picture.

Before updating the user's profile picture, the update manager may further check the user's profile for permissions. Permissions may include any type of permissions. For example, the user may opt-in for the update manager to automatically update the user's profile picture with the still image having the highest image score. In some examples, the user may opt-in for the update manager to provide the user with a certain number of images to choose from. In some examples, the user may opt-out of profile pictures taken from a live video feed. In some examples, the update manager may check for system-level permissions. Some network administrators may not allow recording of any portion of a video taken with company equipment. There may be a system or a domain-wide restriction on updates of the profile pictures. In some embodiments, other portions of the profile updater check the permissions. For example, the image analyzer may check the permissions to determine whether it has permission to analyze the images. Similarly, the image selection manager may check the permissions to determine whether any images may be selected for use by the user. Having robust permissions may help to ensure user privacy.

In some embodiments, the profile updater includes an update timer. The update timer may track whether one or more update criteria have been met for the profile picture. Update criteria may include any type of criteria, including time since last update, the user's physical appearance, image quality, identified image score, any other update criteria, and combinations thereof. For example, for an update criteria of time since the last update, the update timer keeps track of the last time (if ever) the user updated his or her profile picture. If the user has not updated his or her profile picture within a threshold amount of time, the update timer may indicate to the profile updater that it is time to update the profile picture. For example, the update timer may receive an indication from the media application when a video conference is scheduled and/or beginning. The update timer may check to see when the last time the user's profile picture was updated. If the user's profile picture was updated longer than a threshold time ago, then the update timer may indicate that it is time to select a new profile picture, and the profile updater may instruct the image analyzer to analyze the live video feed.

The threshold time may be any length of time. For example, the threshold time may be one day, two days, three days, one week, two weeks, three weeks, four weeks, one month, two months, three months, six months, one year, or any value therebetween. In some embodiments, the threshold time may be less than one day or greater than one year. In some embodiments, the user may set the threshold time in the permissions. In some embodiments, the enterprise, company, or platform may set the threshold time. In this manner, the user may keep his or her profile picture up to date, thereby improving the quality of his or her connections.

In some examples, for an update criteria of a change in the user's physical appearance, the update timer looks for a change in a physical appearance aspect. The physical appearance aspect may be any physical appearance aspect, such as a haircut, hair color, hair style, beard style (including clean shaven), eyewear style, removal of eyewear, weight loss, weight gain, clothing style (e.g., the presence of formal wear), addition/removal of orthodontics, any other physical appearance aspect, and combinations thereof.

In some examples, for an update criteria of an identified image quality or identified image score, the profile updater identifies a still image from the video feed that has a higher image score or a higher image quality than the user's current profile picture. The profile updater may alert the user of the identified still image having the higher image score, and query the user regarding whether he or she would like to update the profile picture.

In some embodiments, the image selection manager 228 includes a machine learning model (MLM) 240. In some embodiments, the MLM 240 includes the image analyzer 222 and/or the image score assigner 230. In some embodiments, the MLM 240 provides instructions and/or parameters for the image analyzer 222 and/or the image score assigner 230. In some embodiments, the image analyzer 222 includes an image analysis MLM 240 and the image score assigner 230 includes an image score assignment MLM 240.

The MLM 240 is initially trained to identify target characteristics 224 generally found in user's profile pictures. Upon a user's first use of the profile updater 218, the MLM 240 identifies target characteristics 224 in the still images 221 from the video feed 220 and select several images to present to the user. The user then chooses an image for his or her updated profile picture. Using this selection, the MLM 240 refines the target characteristics 224, the qualifying values 227, and/or the image score 232 parameters. In this manner, the MLM 240 becomes refined and tailored to select potential updated profile pictures for a specific user.

Figures 1, 3:
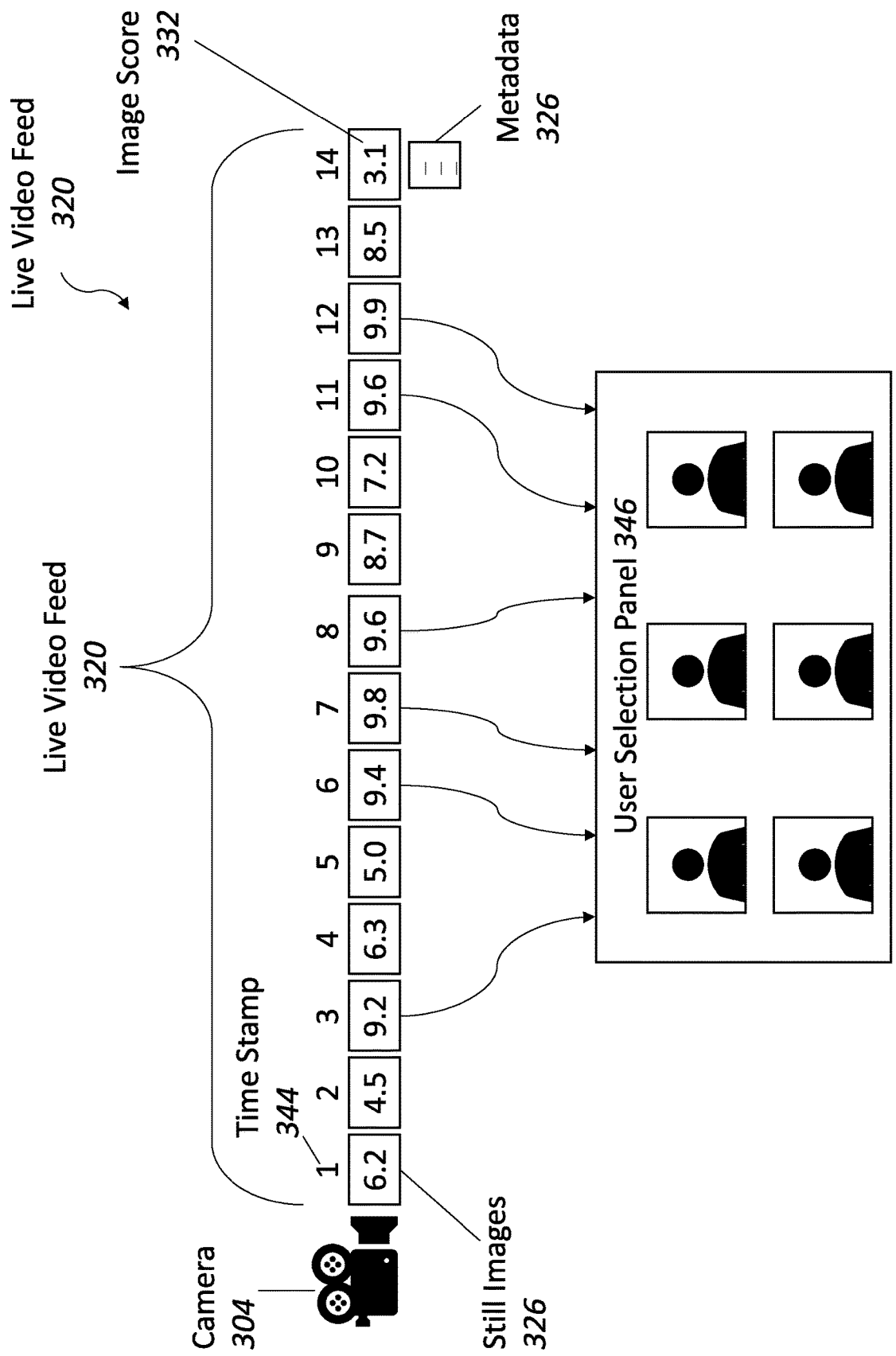
Figures 2, 3:
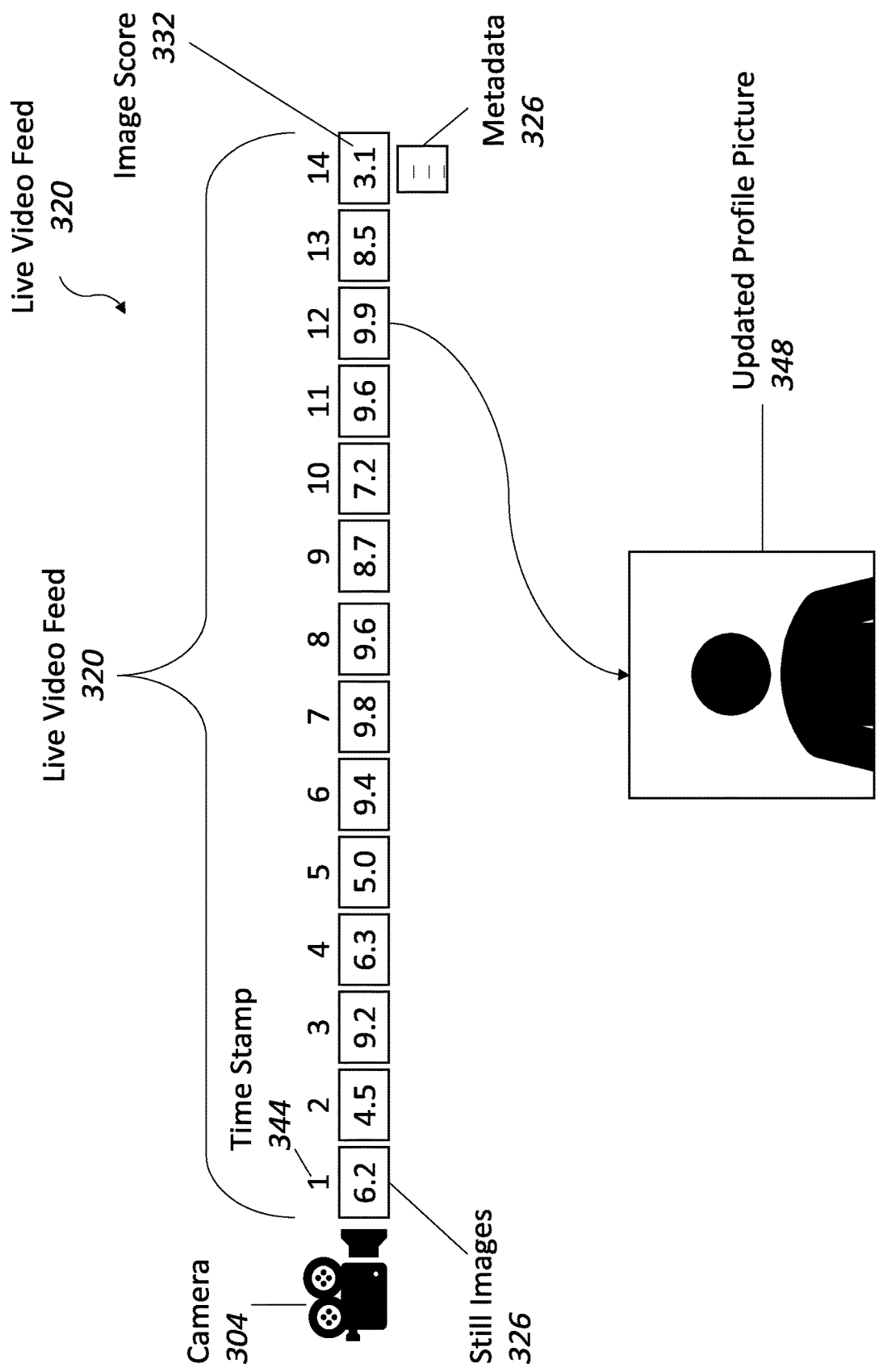

FIG. 3-1 is a representation of a schematic video feed analysis 342, according to at least one embodiment of the present disclosure. In accordance with embodiments of the present disclosure, the video feed analysis 342 is performed by the profile updater 218 of FIG. 2. Put another way, the profile updater 218 of FIG. 2 may perform the video feed analysis 342 shown in FIG. 3-1.

In the embodiment shown, while recording, a camera 304 generates a live video feed 320. The live video feed 320 is made up of a plurality of still images 321. Each still image 321 includes associated image data 326. The image data 326 includes an image score 332. For clarity of illustration, the image data 326 is not shown for each still image 321, and only the image score 332 of each still image 321 is shown in FIG. 3-1. However, it should be understood that each still image 321 includes associated image data 326 in addition to the image score 332 shown.

Each still image 321 is associated with a time stamp 344 along the live video feed 321. The time stamp 344 may be the time the still image 321 was captured from the start of the live video feed 321, the number of the still image 321 in order from the start of the live video feed 320, any other location identifying time stamp 344, and combinations thereof.

In some embodiments, each still image includes a timestamp or other location identifier within the image data. In some embodiments, the image selection manager records the image scores for each still image and the image's associate timestamp in a separate database. At the end of the live feed, the image selection manager may select the still images having the highest image score from the separate database and retrieve the selected still images from the live video feed based on the time stamps. This may reduce the processing requirements of searching the image data of each still image in the live video feed for the image score.

After the camera 304 has finished recording the live video feed 320, an image selectin manager (e.g., the image selection manager 228 of FIG. 2) selects the still images 321 having the highest image score 332. The image selection manager then compiles the selected still images 321 into a user selection panel 346. The user selects his or her updated profile picture from the selected still images in the user selection panel 346.

As discussed herein, the image analyzer may not analyze each still image of the live video feed. In some embodiments, if a given still image reaches a threshold image score, then the unanalyzed still images surrounding the given still image may be analyzed. In this manner, the image analyzer and the image selection manager may work together to find the still image that has the highest image score among the group of still images. This may reduce the processing requirement of the profile updater.

In some embodiments, the image analyzer analyzes the still images for an initial set of target characteristics and the image selection manager may assign an initial image score to the images. The first set of target characteristics may be used to discard still images that may not meet a certain threshold of use, such as images that are blurry, where the user's face is covered, where the user is sneezing, or any other less desirable image. If a still image has a threshold image score, then the image analyzer may analyze the still images using a second set of target characteristics (which may include the first set of target characteristics). Using the second set of target characteristics, the image selection manager may then assign a second image score to the images.

After a video conference is over, the image selection manager may rank each of the analyzed images based on their image score. The image selection manager may then select the still images that have the highest scores. In some embodiments, an update manager provides the user with a plurality of selected images. In some embodiments, the update manager provides the user with the selected images that have the highest image scores. The user may choose one of the images for use as his or her profile picture. In some embodiments, the update manager provides the user with any number of selected images for the user to choose from. For example, the update manager may provide the user with a single image for approval to use as the updated profile picture. In some examples, the update manager may provide the user with 2, 3, 4, 5, 6, 7, 8, 9, 10, or more images to choose from for use as the user's updated profile picture. The update manager may then update the user's profile using the chosen image.

FIG. 3-2 is a representation of the schematic video feed analysis of FIG. 3-1 where the image selection manager automatically updates the users profile picture. In the embodiment shown in FIG. 3-2, each of the still images 21 from the live video feed 320 is assigned an image score 332. The image selection manager identifies the still image 321 that has the highest image score 322 and automatically updates the user's profile picture to the updated profile picture 348.

Figures 1, 4:
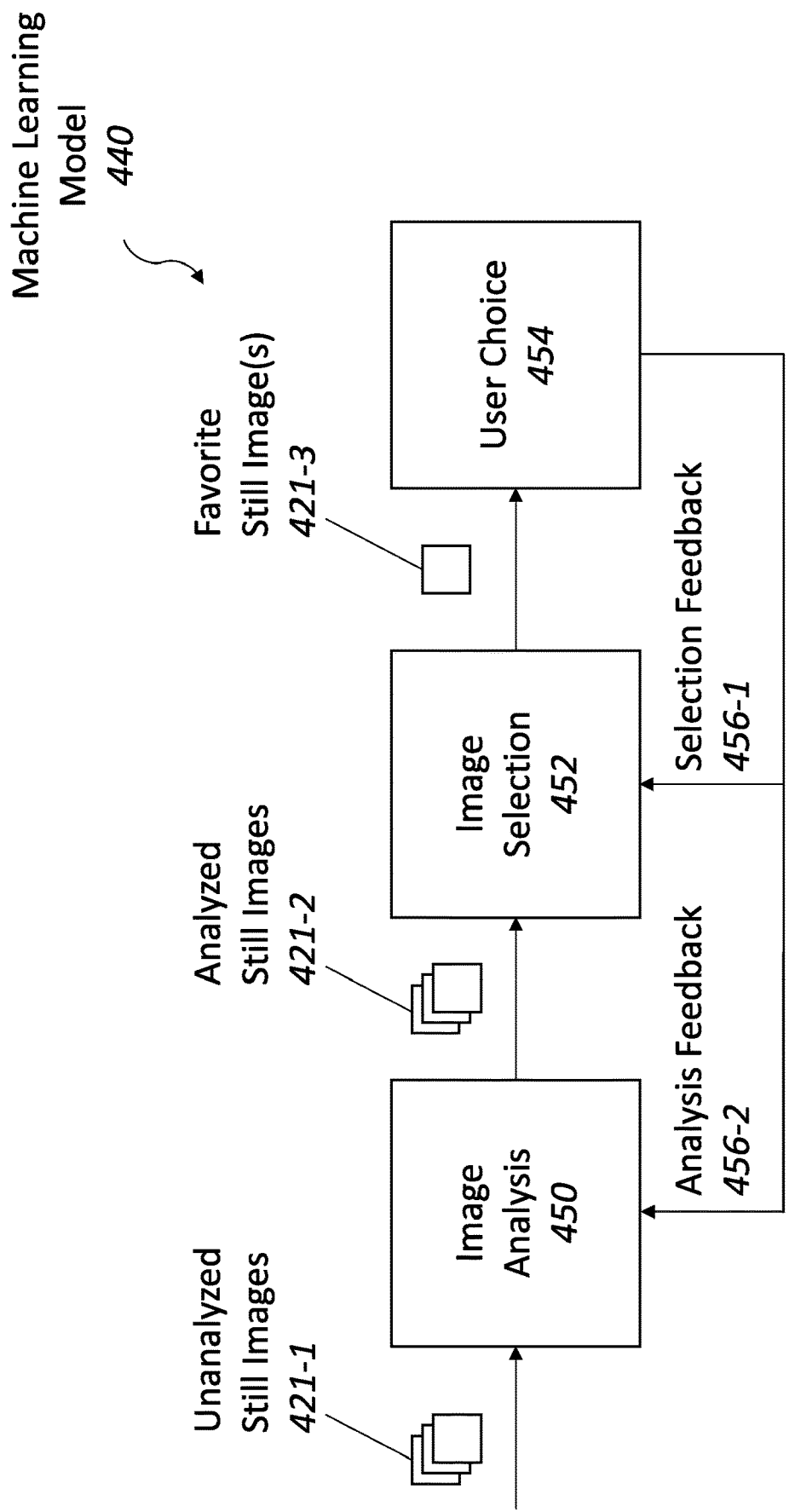
Figures 2, 4:
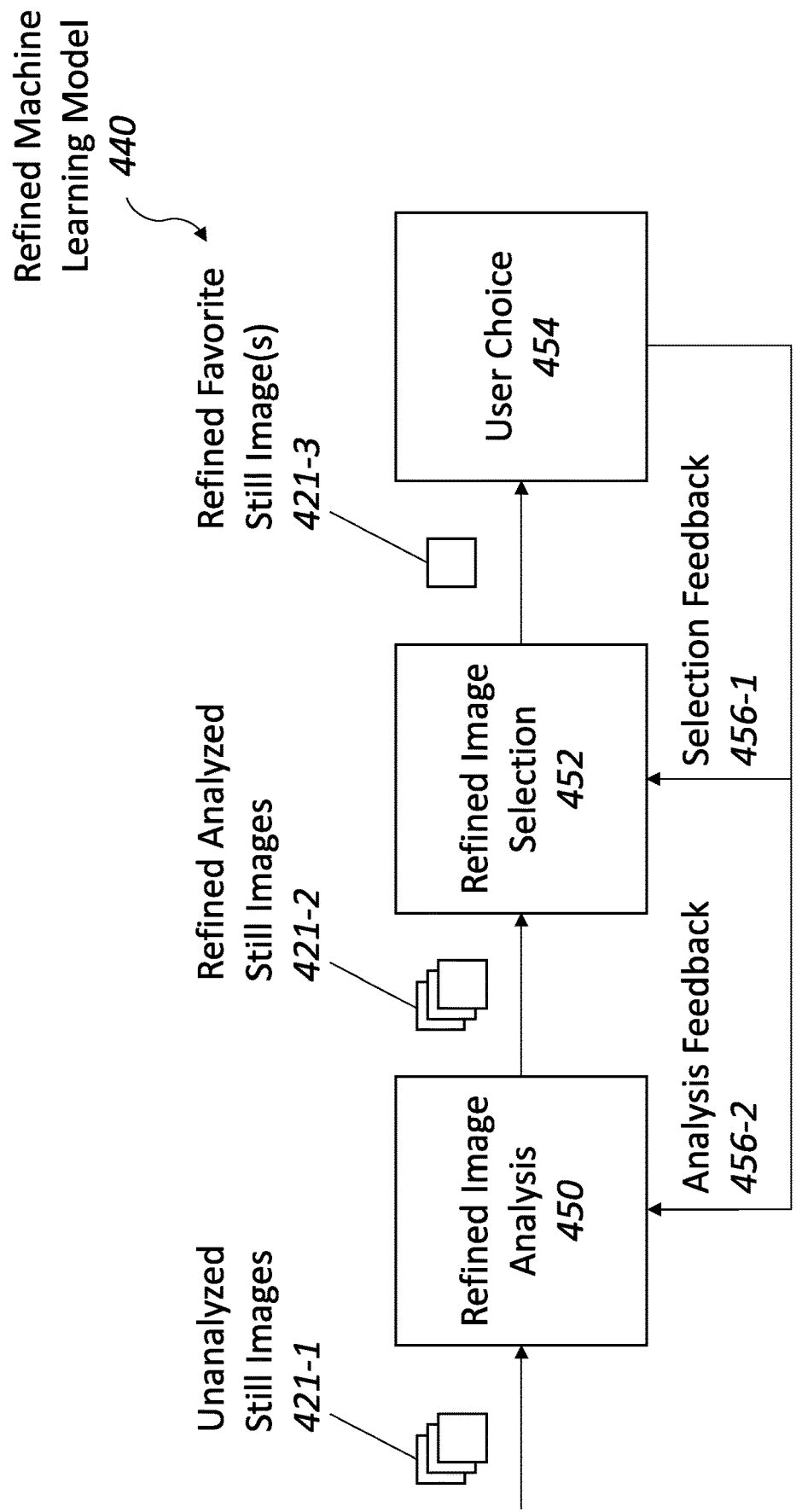

FIG. 4-1 is a representation of a first pass through an MLM 440, according to at least one embodiment of the present disclosure. The MLM 440 of FIG. 4-1 may be implemented on the profile updater 218 of FIG. 2. Put another way, the profile updater 218 of FIG. 2 may implement the MLM 440.

The MLM 440 may include image analysis 450 and image selection 452. During image analysis 450, the MLM 440 receives a live video feed which includes a plurality of unanalyzed still images 421 and prepares analyzed still images 421-2. During image selection 452, the MLM 440 selects one or more favorite images 421-3. In some embodiments, when the user is first implementing the MLM 440, the MLM 440 presents the one or more favorite images 421-3. The user may choose 454 which of the images he or she wishes to use as the updated profile picture.

When the user chooses 454 the updated profile picture, the MLM 440 may receive and/or identify feedback (collectively 456). The MLM 440 may receive and/or identify selection feedback 456-1, related to the selection of the one or more favorite images 421-3. Such selection feedback 456-1 may include which target characteristics should be weighted more heavily and which should be weighted less heavily. Using the selection feedback 456-1, the MLM 440 refines the image selection 452 process to provide the user with favorite images 421-3 that he or she likes more.

The MLM 440 may further receive and/or identify analysis feedback 456-2 related to the identification and qualifying of target characteristics. Such analysis feedback 456-2 may include how to provide qualifying values for the target characteristics. Using the analysis feedback 456-2, the MLM 440 refines the image analysis 450 process to provide the image selection 452 with improved analyzed still images 421-2. In this manner, the MLM 440 may be personalized or trained for a specific user based on the specific user's preferences.

FIG. 4-2 is a representation of subsequent passes through the MLM 440 of FIG. 4-1. On subsequent runs, the MLM 440 has a refined image analysis 450 and a refined image selection 452. In some embodiments, the refined image analysis 450 further receives profile information 460 about the user, including whether the user likes specific target characteristics or combinations of target characteristics. Using this information, the refined image analysis 450 may prepare refined analyzed still images 421-2. The refined image selection 452 may then select one or more refined favorite still images 421-3 from the refined analyzed still images 421-2.

In some embodiments, the MLM 440 automatically updates the user's profile picture using the refined favorite image 421-3. in some embodiments, the MLM 440 prepares a plurality of refined favorite images 421-3 for the user to choose 454 from. Each user's choice 454 may generate additional feedback 456, including additional selection feedback 456-1 and additional analysis feedback 456-2. In this manner, MLM 440 may be continually refined each time the user updates his or her profile picture.

In some embodiments, the profile updater includes one or more machine learning models (MLMs). An MLM may be a computer model that utilizes one or more of feedback loops, neural networks, artificial intelligence, other elements, and combinations thereof, to "learn" from a series of inputs to prepare more sophisticated outputs and/or outputs more finely tailored to a specific application. An MLM may be "trained" by providing the model with many inputs. The MLM may receive instruction to analyze the inputs for certain elements. MLMs may be used to identify trends in groups of and assign data to categories based on identified trends.

In accordance with embodiments of the present disclosure, profile updater includes one or more MLMs trained to recognize still images from a live video feed that may be used to update a user profile. When the profile updater first utilizes an MLM, the MLM may be trained to identify one or more favorite still images based on image characteristics of the images. The MLM may be trained to quickly identify the image characteristics on still images from a video feed, and, using those image characteristics, provide an image score for each analyzed still image. The still images may be used to update the user's profile picture.

The profile updater may provide the selected images to a user for feedback. In some embodiments, the user feedback includes a user choice of a new profile picture. In some embodiments, the user feedback includes a user ranking of favorite to least favorite image among the provided images. In some embodiments, the user feedback includes a choice of a favorite image, and an indication of why the image is favorite. For example, the user may indicate target characteristics that he or she likes about a particular image, such as the amount of teeth showing in a smile. In some embodiments, the user feedback includes a choice of a non-favorite image. In some embodiments, the user is able to provide an indication of why he or she did not like the non-favorite image. For example, the user may indicate target characteristics that the user did not like about a particular image, such as how his or her eyes were opened.

The MLM may receive the user input and use it to refine the MLM. The MLM may be refined by the received user input in any way. For example, the MLM may be refined by adjusting the weight of a particular target characteristic on an image score. In some embodiments, the next time the profile updater is used to update the user's profile picture, the MLM may identify and select new images that are a closer match to the user's desired profile picture. In some embodiments, the MLM compares the user's chosen still image with the unchosen still images to ascertain the differences between them. Based on these differences, the MLM may be refined to modify the weight of the target characteristics.

In some embodiments, the MLM becomes a refined MLM (e.g., a refined machine learning model) using user feedback and/or user input. The refined MLM may analyze a new live video feed and output a new favorite still image. For example, the MLM may include an image analysis section. The image analysis section may analyze still images from the video feed. Using user feedback and/or user input, the MLM may be refined to include a refined image analysis section. In some embodiments, refining the image analysis section includes modifying the target characteristics and/or modifying the qualifying values of the target characteristics. The refined image analysis section may analyze the raw still images from the live video feed, resulting in one or more refined analyzed still images.

The MLM may further include an image selection section. The image selection section may select one or more still images from the analyzed images for selection by the user and/or updating of the profile picture. In some embodiments, the image selection section selects or outputs a favorite still image (e.g., a selected favorite still image). The image selection section may be refined using the user feedback and/or user input into a refined image selection section. In some embodiments, the image selection section is refined by modifying the image score calculation. The refined image section may output refined and/or new selected images. In some embodiments, the refined image section outputs refined and/or a new favorite still images.

In some embodiments, the refined MLM receives new user input and/or feedback, resulting in further refinement of the MLM. In some embodiments, as the MLM model becomes more refined, the profile updater predicts which image will be chosen by the user. The profile updater may provide the user with an indication of the predicted image. If the user chooses the predicted image, then the MLM model may reinforce previous refinements.

In some embodiments, the profile updater prompts the user to change his or her settings to automatic updates of the profile picture. If the user opts-in to automatic updates, the profile updater may analyze images from the live video feed, select the images from the live video feed, and update the user's profile with the still image having the highest image score, without input by the user. In some embodiments, as the MLM's prediction engine becomes more accurate to the user's preferences, the profile updater prompts the user to turn on automatic updates after the MLM successfully predicts which image will be chosen by the user. In some embodiments, the profile updater prompts the user to turn on automatic updates after the MLM successfully predicts which image will be chosen by the user twice in a row, three times in a row, four times in a row, five times in a row, six times in a row, or more times in a row. Multiple correct predictions may help to ensure the MLM is accurately predicting the user's chosen profile picture update.

Figure 5:
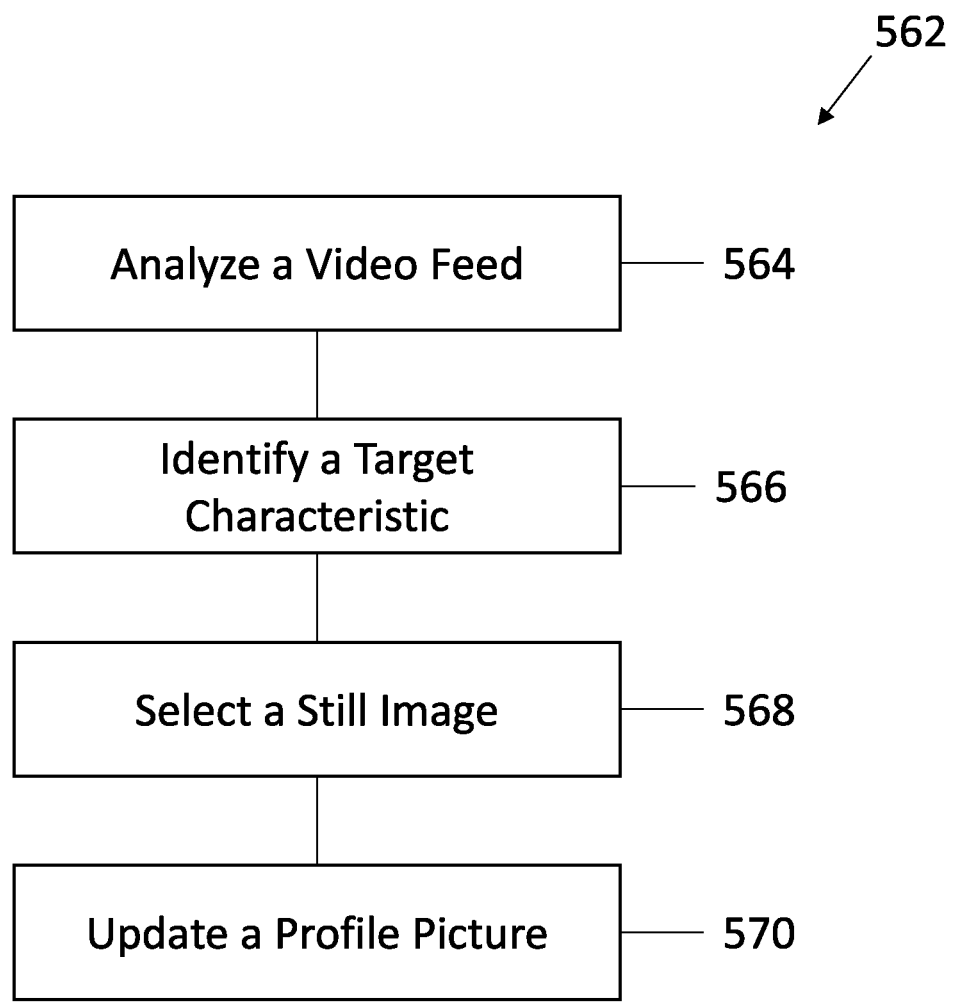
FIG. 5 is a representation of a method for updating a profile picture, according to at least one embodiment of the present disclosure.

FIG. 5 is a representation of a method 562 for updating a profile picture from a video feed, according to at least one embodiment of the present disclosure. The method 562 includes analyzing a video feed, or a plurality of still images from a video feed, at 564. A profile updater identifies one or more target characteristics in the plurality of still images at 566. Based on the identified target characteristics, at least one image of the plurality of still images is selected at 568. The profile picture is then updated using the selected still images at 570.

Figure 6:
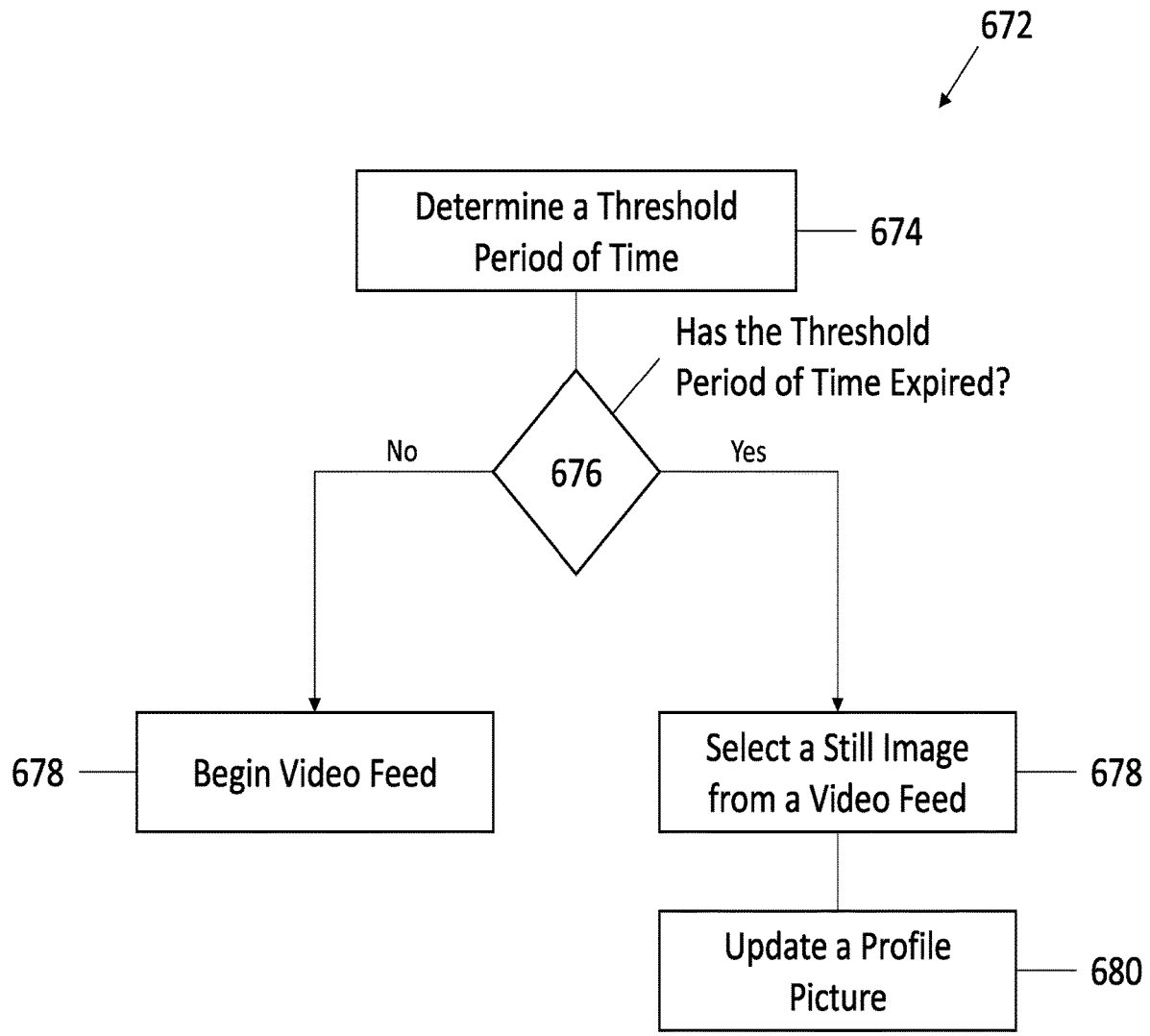
FIG. 6 is a representation of another method for updating a profile picture, according to at least one embodiment of the present disclosure.

FIG. 6 is a representation of a method 572 for updating a profile picture from a video feed, according to at least one embodiment of the present disclosure. The method 572 includes determining a threshold period of time between profile picture updates at 574. A profile updater then determines whether the threshold period of time has been exceeded at 576. If the threshold period of time has passed, then a still image is selected from the live video feed at 578. The profile picture is then updated using the selected still image at 580. If the threshold period of time has not passed, then the media application may begin the video without reviewing the still images for a new profile picture at 582.

Figure 7:
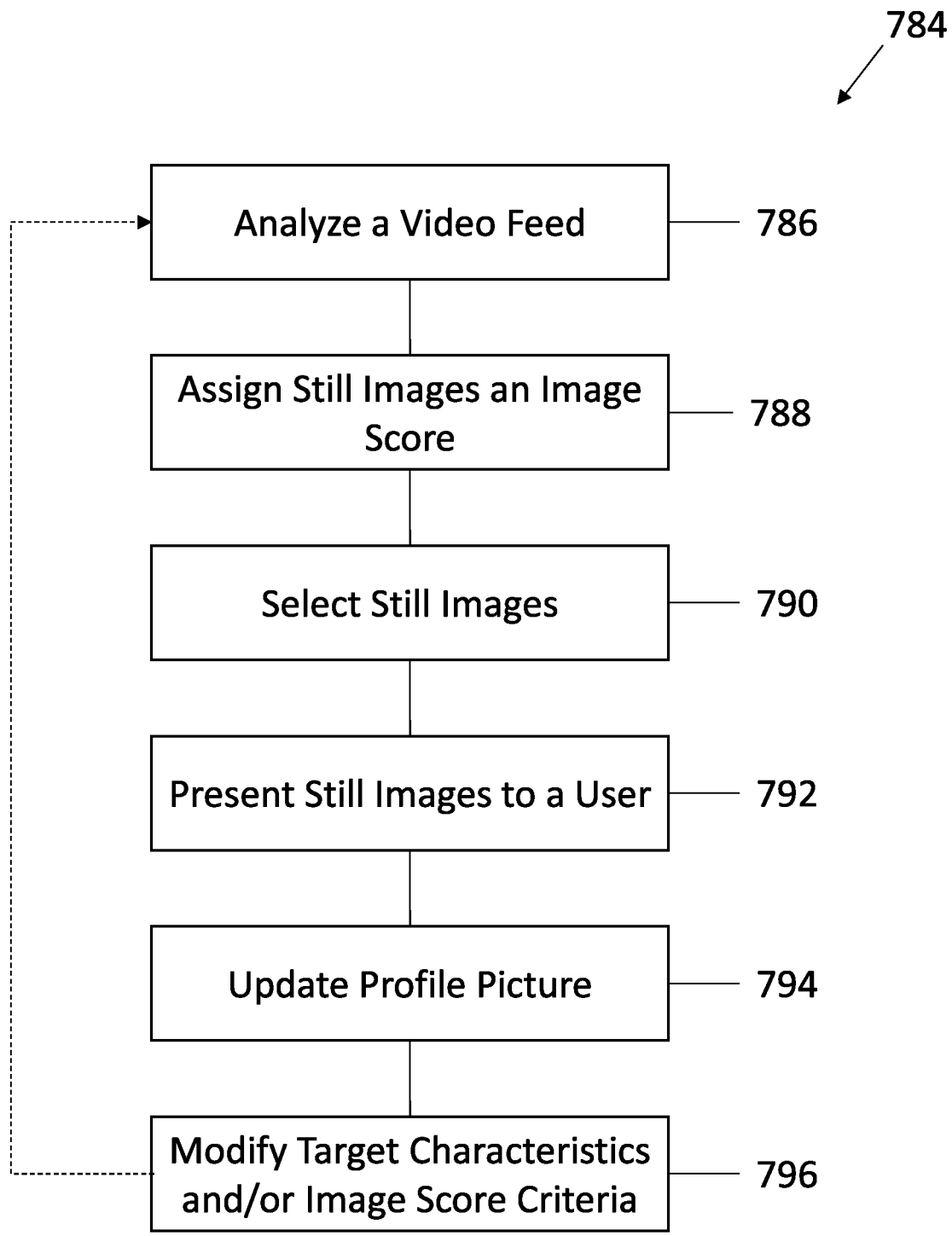
FIG. 7 is a representation of yet another method for updating a profile picture, according to at least one embodiment of the present disclosure.

FIG. 7 is a representation of a method 684 for updating a profile picture, according to at least one embodiment of the present disclosure. The method 684 includes analyzing a video feed for one or more target characteristics of a subject in the video feed at 786. An image score is assigned to a plurality of still images from the video feed based on the one or more target characteristics at 788. A profile updater selects a set of the plurality of still images from the video feed based on the image score at 790. The set of the plurality of still images is presented to the user for choice as an updated profile picture at 792. The profile picture is then updated with the chosen still images at 794. Using feedback from the user and/or identified based on the user's choice, one or both of (1) the one or more target characteristics may be modified, or (2) the image score calculation criteria may be modified at 796.

INDUSTRIAL APPLICABILITY

Many modern computing devices allow a user to video conference with other users. In a video conference, a live stream of a video is transmitted from one location to another. Many people best connect with others when they have a visual representation of that person in their head. Video conferencing allows two people to build and/or maintain connections, even if they are located remotely from each other. Furthermore, many media platforms which facilitate video conferencing may allow a user to create a user profile. The user profile may include a profile picture of the user. Conventionally, the user may need to manually upload and/or update his or her profile picture. Many users forget or do not want to spend time uploading/updating their profile picture. This may result in profile pictures that are out of date. As video conferencing becomes more prevalent, it may quickly become apparent if the user's current likeness does not match the image in the profile picture. This disconnect between the user's current image and the profile picture may reduce the quality of the user's connection with others.

In accordance with embodiments of the present disclosure, a media application includes a profile updater. A media application may be any application that facilitates live video recording, live video conferencing, any other use or manipulation of live video, and combinations thereof. For example, a media application may include a social media application, a messaging application, a video conferencing application, any other type of media application, and combinations thereof. In some embodiments, the profile updater is a native part of the media application. In some embodiments, the profile updater is an add-on to the media application.

The profile updater may have access to the camera of a computing device. The profile updater may receive the video feed from the camera. As may be understood, a video feed consists of a series of still images displayed in rapid succession. The profile updater includes an image analyzer. The image analyzer may analyze the still images from the video feed for one or more target characteristics. The target characteristics may be any type of image characteristic. In some embodiments, the target characteristics include one or more image quality features, such as image blurriness, exposure, shadowing, and so forth. In some embodiments, the target characteristics include background and/or foreground information. For example, the image analyzer may determine whether a portion of an image is in the background or the foreground (e.g., is part of the user). In some embodiments, the target characteristics include bodily information about the user. For example, the image analyzer may determine whether portions of a user's body are fully visible, such as the user's ears, eyes, nose, hair, chin, shoulders, arms, hands, legs, torso, any other portion of the user's body, and combinations thereof. In some embodiments, the target characteristics include information about a particular portion of the user's body. For example, the target characteristics may include whether a user is smiling, how much of a user's teeth are showing, whether a user's eyes are open, whether the user's hand is near his or her face, and so forth. In some embodiments, the image analyzer may analyzes any other image characteristic, and any combination of image characteristics.

As discussed herein, the profile updater may analyze a live video feed. A live video feed is a video feed in which the user is interacting with another individual over the Internet. In some embodiments, the user interacts with the other individual in real time. In some embodiments, the elements of the profile updater, including the image analyzer, the image selection manager, the update manager, any other portions of the profile updater, and combinations thereof, analyze the live video feed in real time. Put another way, the live video feed may be analyzed in real time. For example, the image analyzer may analyze an image captured by the camera as soon as it is captured, or within an analysis period after capture. The analysis period may be 16 ms, 20 ms, 25 ms, 50 ms, 75 ms, 100 ms, 150 ms, 200 ms, 250 ms, 300 ms, 350 ms, 400 ms, 450 ms, 500 ms, 600 ms, 700 ms, 800 ms, 900 ms, 1000 ms, 5 s, 10 s, 15 s, 30 s, 1 min, 5 min, 10 min, 15 min, 30 min, 1 hour, or any value therebetween.

In some embodiments, the image analyzer analyzes the image before the image is presented to the user and/or transmitted as part of the video conference. In some embodiments, the image analyzer analyzes the image after the image is presented to the user and/or transmitted as part of the video conference. This may help to prevent and/or reduce delays in the processing and transmitting of the live video feed. While embodiments of the present disclosure discuss the use of a live video feed, it should be understood that the principles of the present disclosure may be applied to a pre-recorded video feed. For example, a video conference may be recorded, and the profile updater may be applied to a previously recorded video conference. In some embodiments, still images from the video conference are stored in a memory cache of the profile updater. After the profile updater has completed updating the user's profile, the cache may be wiped to reduce the memory requirements of the profile updater.

Utilizing a live video feed may help the profile updater to collect candid images of the user. A candid image of the user is an image that is not a reaction to pre-recorded media and/or pre-scripted. For example, a candid image is an image that is not provided as a response to any other media outside of the video conference. Put another way, a candid image is independent of other media content and/or other pre-recorded media. This may help to collect genuine expressions of the user. Many people react positively to genuine expressions, and collecting candid images from a live video feed may help to prepare positive images with genuine expressions.

In some embodiments, a target characteristic includes a qualifying value. For example, the target characteristic of whether a user's eyes are open may include a value relating the percentage the user's eyes are open. In some examples, the target characteristic of whether a user is smiling may include a value relating to the extent of the smile. In some examples, the target characteristic of whether the user is shadowed (e.g., shadow presence) may include a value of the shadow contrast and/or the shadow location. As may be seen, each of the target characteristics may include a qualifying value that is associated with the target characteristic.

In some embodiments, the target characteristic and/or any qualifying values associated with that target characteristic is assigned to the still image's image data. In some embodiments, the still image's image data is stored in a metadata file associated with the still image. For example, the target characteristic and/or qualifying values may be appended on an image data file, or data file associated with the still image. Assigning the target characteristic and/or qualifying values to image data may help the profile updater to manage the target characteristics. This may reduce the amount of time and/or processing used by the image selection manager to analyze the target characteristics and/or the qualifying values and assign the still image an image score.

During a video feed, the image analyzer may process the still images that form the video feed. In some embodiments, the image analyzer analyzes each still image of the video feed. In some embodiments, the image analyzer does not analyze each still image in the video feed. In some embodiments, the image analyzer analyzes selected still images in a pattern. For example, the image analyzer may analyze every other still image, every third still image, every fourth still image, every fifth still image, every sixth still image, and so forth. In some embodiments, the image analyzer analyzes an image periodically. For example, the image analyzer may analyze a still image every 16 ms, 20 ms, 25 ms, 50 ms, 75 ms, 100 ms, 150 ms, 200 ms, 250 ms, 300 ms, 350 ms, 400 ms, 450 ms, 500 ms, 600 ms, 700 ms, 800 ms, 900 ms, 1000 ms, or any value therebetween. In some embodiments, the image analyzer analyzes the still images of the video feed using one or more of a pattern, a period, any other mechanism, and combinations thereof.

The profile updater may further include an image selection manager. The image selection manager select still images from the video feed using the analyzed target characteristics. To select the images, the image selection manager may use the target characteristics identified in the images by the image analyzer. In some embodiments, the image selection manager collects the target characteristics and/or any qualifying values from the still image's image data. The image selection manager may include an image score assigner, which may assign each still image an image score based on the identified target characteristics. The image score may take into account the qualifying value of one or more target characteristics of the image. For the purposes of this disclosure, a high score may be associated with a more desirable or a more highly favored image, while a low score may be associated with a less desirable or less favored image. However, it should be understood that the score is somewhat arbitrary, and a low score may be associated with a better image and a high score may be associated with a worse image, depending on how the score is determined. In some embodiments, the image selection manager records the image score in the still image's image data. For example, after determining an image score, the image selection manager may modify the still image's image data to include the image score. In some embodiments, after the live video feed has ended, the image selection manager simply searches the image data of each image to identify the still images having the largest image score.

In some embodiments, each still image includes a timestamp or other location identifier within the image data. In some embodiments, the image selection manager records the image scores for each still image and the image's associate timestamp in a separate database. At the end of the live feed, the image selection manager may select the still images having the highest image score from the separate database and retrieve the selected still images from the live video feed based on the time stamps. This may reduce the processing requirements of searching the image data of each still image in the live video feed for the image score.

In some embodiments, a target characteristic has a strong enough weight that that characteristic alone can lower the image score to below a selection threshold. For example, if all of the user's facial features are not visible, the image score may be below the selection threshold. In some examples, if the user's hands, arms, feet, or other non-head and shoulders portion of the user are visible in the image, then the image score may be below the selection threshold. In some examples, if the blurriness is high, then the image score may be below the selection threshold. In some examples, if the background is indistinguishable from the foreground, then the image score may be below the selection threshold. In some examples, if another person is detected in the background, then the image score may be below the selection threshold. In some embodiments, the user is able to select target characteristics that can automatically drop the image score below the selection threshold.

In some embodiments, the image score is calculated using the target characteristics. Each target characteristic may include a weight. A target characteristic having a heavier weight may have a larger impact on the image score than a target characteristic having a lighter weight. For example, the blurriness of an image may have a larger impact on the image score than the extent of the user's smile. In some examples, whether the user's eyes are open may have a larger impact on the image score than the angle of the user's head. In some embodiments, the weight of each target characteristic is assigned by the profile updater. In some embodiments, the user is able to change the weight of certain target characteristics. For example, the user may prefer pictures with a closed-mouth smile. The user may indicate this preference in the permission or other profile settings. When the image selection manager is reviewing each still image, the image selection manager may assign the target characteristic of a closed mouth a higher weight. This may help to provide the user with potential profile pictures that are in line with his or her preferences.

As discussed herein, the image analyzer may not analyze each still image of the live video feed. In some embodiments, if a given still image reaches a threshold image score, then the unanalyzed still images surrounding the given still image are analyzed. In this manner, the image analyzer and the image selection manager may work together to find the still image that has the highest image score among the group of still images. This may reduce the processing requirement of the profile updater.

In some embodiments, the image analyzer analyzes the still images for an initial set of target characteristics and the image selection manager may assign an initial image score to the images. The first set of target characteristics may be used to discard still images that may not meet a certain threshold of use, such as images that are blurry, where the user's face is covered, where the user is sneezing, or any other less desirable image. If a still image has a threshold image score, then the image analyzer may analyze the still images using a second set of target characteristics (which may include the first set of target characteristics). Using the second set of target characteristics, the image selection manager may then assign a second image score to the images.

After a video conference is over, the image selection manager may rank each of the analyzed images based on their image score. The image selection manager may then select the still images that have the highest scores. In some embodiments, an update manager provides the user with a plurality of selected images. In some embodiments, the update manager provides the user with the selected images that have the highest image scores. The user may choose one of the images for use as his or her profile picture. In some embodiments, the update manager provides the user with any number of selected images for the user to choose from. For example, the update manager may provide the user with a single image for approval to use as the updated profile picture. In some examples, the update manager may provide the user with 2, 3, 4, 5, 6, 7, 8, 9, 10, or more images to choose from for use as the user's updated profile picture. The update manager may then update the user's profile using the chosen image.

Before updating the user's profile picture, the update manager may further check the user's profile for permissions. Permissions may include any type of permissions. For example, the user may opt-in for the update manager to automatically update the user's profile picture with the still image having the highest image score. In some examples, the user may opt-in for the update manager to provide the user with a certain number of images to choose from. In some examples, the user may opt-out of profile pictures taken from a live video feed. In some examples, the update manager may check for system-level permissions. Some network administrators may not allow recording of any portion of a video taken with company equipment. There may be a system or a domain-wide restriction on updates of the profile pictures. In some embodiments, other portions of the profile updater checks the permissions. For example, the image analyzer may check the permissions to determine whether it has permission to analyze the images. Similarly, the image selection manager may check the permissions to determine whether any images may be selected for use by the user. Having robust permissions may help to ensure user privacy.

In some embodiments, the profile updater includes an update timer. The update timer may keep track of the last time (if ever) the user updated his or her profile picture. If the user has not updated his or her profile picture within a threshold amount of time, the update timer may indicate to the profile updater that it is time to update the profile picture. For example, the update timer may receive an indication from the media application when a video conference is scheduled and/or beginning. The update timer may check to see when the last time the user's profile picture was updated.

If the user's profile picture was updated longer than a threshold time ago, then the update timer may indicate that it is time to select a new profile picture, and the profile updater may instruct the image analyzer to analyze the live video feed.

In some embodiments, the threshold time is any length of time. For example, the threshold time may be one day, two days, three days, one week, two weeks, three weeks, four weeks, one month, two months, three months, six months, one year, or any value therebetween. In some embodiments, the threshold time is less than one day or greater than one year. In some embodiments, the user sets the threshold time in the permissions. In this manner, the user may keep his or her profile picture up to date, thereby improving the quality of his or her connections.

In some embodiments, the profile updater includes one or more machine learning models (MLMs). An MLM may be a computer model that utilizes one or more of feedback loops, neural networks, artificial intelligence, other elements, and combinations thereof, to "learn" from a series of inputs to prepare more sophisticated outputs and/or outputs more finely tailored to a specific application. An MLM may be "trained" by providing the model with many inputs. The MLM may receive instruction to analyze the inputs for certain elements. MLMs may be used to identify trends in groups of and assign data to categories based on identified trends.

In accordance with embodiments of the present disclosure, profile updater includes one or more MLMs trained to recognize still images from a live video feed that may be used to update a user profile. When the profile updater first utilizes an MLM, the MLM may be trained to identify one or more favorite still images based on image characteristics of the images. The MLM may be trained to quickly identify the image characteristics on still images from a video feed, and, using those image characteristics, provide an image score for each analyzed still image. The still images may be used to update the user's profile picture.

The profile updater may provide the selected images to a user for feedback. In some embodiments, the user feedback includes a user choice of a new profile picture. In some embodiments, the user feedback includes a user ranking of favorite to least favorite image among the provided images. In some embodiments, the user feedback includes a choice of a favorite image, and an indication of why the image is favorite. For example, the user may indicate target characteristics that he or she likes about a particular image, such as the amount of teeth showing in a smile. In some embodiments, the user feedback includes a choice of a non-favorite image. In some embodiments, the user provides an indication of why he or she did not like the non-favorite image. For example, the user may indicate target characteristics that the user did not like about a particular image, such as how his or her eyes were opened.

The MLM may receive the user input and use it to refine the MLM. The MLM may be refined by the received user input in any way. For example, the MLM may be refined by adjusting the weight of a particular target characteristic on an image score. In some embodiments, the next time the profile updater is used to update the user's profile picture, the MLM identifies and select new images that are a closer match to the user's desired profile picture. In some embodiments, the MLM compares the user's chosen still image with the unchosen still images to ascertain the differences between them. Based on these differences, the MLM may be refined to modify the weight of the target characteristics.

In some embodiments, the MLM becomes a refined MLM (e.g., a refined machine learning model) using user feedback and/or user input. The refined MLM may analyze a new live video feed and output a new favorite still image. For example, the MLM may include an image analysis section. The image analysis section may analyze still images from the video feed. Using user feedback and/or user input, the MLM may be refined to include a refined image analysis section. In some embodiments, refining the image analysis section includes modifying the target characteristics and/or modifying the qualifying values of the target characteristics. The refined image analysis section may analyze the raw still images from the live video feed, resulting in one or more refined analyzed still images.

The MLM may further include an image selection section. The image selection section may select one or more still images from the analyzed images for selection by the user and/or updating of the profile picture. In some embodiments, the image selection section selects or outputs a favorite still image (e.g., a selected favorite still image). The image selection section may be refined using the user feedback and/or user input into a refined image selection section. In some embodiments, the image selection section is refined by modifying the image score calculation. The refined image section may output refined and/or new selected images. In some embodiments, the refined image section outputs refined and/or a new favorite still images.

In some embodiments, the refined MLM receives new user input and/or feedback, resulting in further refinement of the MLM. In some embodiments, as the MLM model becomes more refined, the profile updater predicts which image will be chosen by the user. The profile updater may provide the user with an indication of the predicted image. If the user chooses the predicted image, then the MLM model may reinforce previous refinements.

In some embodiments, the profile updater prompts the user to change his or her settings to automatic updates of the profile picture. If the user opts-in to automatic updates, the profile updater may analyze images from the live video feed, select the images from the live video feed, and update the user's profile with the still image having the highest image score, without input by the user. In some embodiments, as the MLM's prediction engine becomes more accurate to the user's preferences, the profile updater prompts the user to turn on automatic updates after the MLM successfully predicts which image will be chosen by the user. In some embodiments, the profile updater prompts the user to turn on automatic updates after the MLM successfully predicts which image will be chosen by the user twice in a row, three times in a row, four times in a row, five times in a row, six times in a row, or more times in a row. Multiple correct predictions may help to ensure the MLM is accurately predicting the user's chosen profile picture update.

Following are sections of embodiments in accordance with the present disclosure:

A1. A method for updating a profile picture (114) of a user comprises: determining that one or more update criteria are met for the profile picture; analyzing a plurality of frames (326) from a recent video feed (320) of the user to identify one or more target characteristics (224); selecting a still image of the plurality of frames based on the identified one or more target characteristics; and in accordance with the selection, replacing the profile picture with the selected still image.

A2. The method of section A1, in some embodiments, the profile picture is replaced automatically without input from a user.

A3. The method of section A1 or A2, in some embodiments, prior to replacing the profile picture, querying the user on whether to update the profile picture with the selected still image, wherein the profile picture is replaced in response to a user acceptance of the selected still image in response to the query.

A4. The method of any of sections A1-A3, in some embodiments, the method further comprises: selecting one or more additional still images based on the identified one or more target characteristics; and querying the user to choose an image from among the selected still image and the selected one or more additional still images, wherein the profile picture is replaced in response to the user choosing the selected still image.

A5. The method of any of sections A1-A4, in some embodiments, the recent video feed is a live video feed and wherein the plurality of frames is analyzed in real time.

A6. The method of any of sections A1-A5, in some embodiments, the one or more target characteristics include at least one of user features, user posture, camera angle, background distinction, image blurriness, or lighting and shadows.

A7. The method of any of sections A1-A6, in some embodiments, the method further comprises assigning a respective image score to each image of the plurality of frames, wherein the still image is selected based on the respective image scores.

A8. The method of any of sections A1-A7, in some embodiments, the one or more update criteria comprise a threshold period of time between profile picture updates, and wherein the profile picture is replaced in accordance with the threshold period of time being exceeded.

A9. The method of section A8, in some embodiments, the recent video feed comprises a video feed occurring within the threshold period of time.

A10. The method of section A8 or A9, in some embodiments, the threshold period of time is greater than two weeks.

A11. The method of any of sections A1-A10, in some embodiments, the one or more update criteria comprise detecting a change in physical appearance of the user.

A12. The method of any of sections A1-A11, in some embodiments, the method further comprises, before replacing the profile picture, receiving an opt-in permission from the user.

A13. The method of any of sections A1-A12, in some embodiments, the method further comprises: receiving a machine learning model (440) trained to identify a favorite still image (421-3) from the plurality of frames based on the identified one or more image characteristics; providing the machine learning model with the recent video feed; selecting the selected still image using on the favorite still image from the plurality of frames based on the one or more image characteristics; receiving user input from a user based on the selected still image; refining the machine learning model for the user based on the received user input in connection with one or more favorite still images selected by the machine learning model; and applying the refined machine learning model to a new live video feed to select a new favorite still image based on the refined machine learning model.

A14. The method of section A13, in some embodiments, refining the machine learning model includes receiving at least one of analysis feedback (456-2) or selection feedback (456-1).

A15. The method of section A13 or A14, in some embodiments, the method further comprises refining the refined machine learning model for the user with new user input based on the new favorite still image.

A16. The method of any of sections A13-A15, in some embodiments, the method further comprises performing an image analysis to identify the one or more image characteristics in a plurality of still images of the live video feed, wherein the favorite image is selected from the plurality of still images.

A17. The method of any of sections A13-A16, wherein refining the machine learning model includes refining a weight of the one or more target characteristics in an image score.

A18. In some embodiments, a computing system comprises: a processor and memory, the memory including instructions which, when accessed by the processor, cause the processor to: determine that one or more update criteria are met for a profile picture (114) of a user; analyze a plurality of frames (326) from a recent video feed (320) of the user to identify one or more target characteristics (224); select a still image of the plurality of frames based on the identified one or more target characteristics; and in accordance with the selection, replace the profile picture with the selected still image.

A19. The system of section A18, in some embodiments, the system replaces the profile picture with the selected still image automatically without input from the user.

A20. In some embodiments, a computing system comprises: a processor and memory, the memory including instructions which, when accessed by the processor, cause the processor to: receive a machine learning model (440) trained to identify a favorite still image from a live video feed (421-1) based on one or more image characteristics (224); provide the machine learning model with the live video feed; select the favorite still image from the live video feed based on the one or more image characteristics; receive user input from a user based on the selected favorite still image; refine the machine learning model for the user based on the received user input in connection with one or more favorite still images selected by the machine learning model; and apply the refined machine learning model to a new live video feed to select a new favorite still image based on the refined machine learning model.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for updating a profile picture of a user, comprising:
   determining that one or more update criteria are met for the profile picture;
   analyzing a plurality of frames from a recent video feed of the user to identify one or more target characteristics;
   selecting a still image of the plurality of frames based on the identified one or more target characteristics; and
   in accordance with the selection, replacing the profile picture with the selected still image.

2. The method of claim 1, wherein the profile picture is replaced automatically without input from a user.

3. The method of claim 1, further comprising, prior to replacing the profile picture, querying the user on whether to update the profile picture with the selected still image, wherein the profile picture is replaced in response to a user acceptance of the selected still image in response to the query.

4. The method of claim 1, further comprising:
   selecting one or more additional still images based on the identified one or more target characteristics; and
   querying the user to choose an image from among the selected still image and the selected one or more additional still images, wherein the profile picture is replaced in response to the user choosing the selected still image.

5. The method of claim 1, wherein the recent video feed is a live video feed and wherein the plurality of frames is analyzed in real time.

6. The method of claim 1, wherein the one or more target characteristics include at least one of user features, user posture, camera angle, background distinction, image blurriness, or lighting and shadows.

7. The method of claim 1, further comprising assigning a respective image score to each image of the plurality of frames, wherein the still image is selected based on the respective image scores.

8. The method of claim 1, wherein the one or more update criteria comprise a threshold period of time between profile picture updates, and wherein the profile picture is replaced in accordance with the threshold period of time being exceeded.

9. The method of claim 8, wherein the recent video feed comprises a video feed occurring within the threshold period of time.

10. The method of claim 8, wherein the threshold period of time is greater than two weeks.

11. The method of claim 1, wherein the one or more update criteria comprise detecting a change in physical appearance of the user.

12. The method of claim 1, further comprising, before replacing the profile picture, receiving an opt-in permission from the user.

13. The method of claim 1, further comprising:
   receiving a machine learning model trained to identify a favorite still image from the plurality of frames based on the identified one or more image characteristics;
   providing the machine learning model with the recent video feed;
   selecting the selected still image using on the favorite still image from the plurality of frames based on the one or more image characteristics;
   receiving user input from a user based on the selected still image;
   refining the machine learning model for the user based on the received user input in connection with one or more favorite still images selected by the machine learning model; and
   applying the refined machine learning model to a new live video feed to select a new favorite still image based on the refined machine learning model.

14. The method of claim 13, wherein refining the machine learning model includes receiving at least one of analysis feedback or selection feedback.

15. The method of claim 13, further comprising refining the refined machine learning model for the user with new user input based on the new favorite still image.

16. The method of claim 13, further comprising performing an image analysis to identify the one or more image characteristics in a plurality of still images of the live video feed, wherein the favorite image is selected from the plurality of still images.

17. The method of claim 13, wherein refining the machine learning model includes refining a weight of the one or more target characteristics in an image score.

18. A computing system, comprising:
a processor and memory, the memory including instructions which, when accessed by the processor, cause the processor to:
determine that one or more update criteria are met for a profile picture of a user;
analyze a plurality of frames from a recent video feed of the user to identify one or more target characteristics;
select a still image of the plurality of frames based on the identified one or more target characteristics; and
in accordance with the selection, replace the profile picture with the selected still image.

19. The system of claim 18, wherein the system replaces the profile picture with the selected still image automatically without input from the user.

20. A computing system, comprising:
a processor and memory, the memory including instructions which, when accessed by the processor, cause the processor to:
receive a machine learning model trained to identify a favorite still image from a live video feed based on one or more image characteristics;
provide the machine learning model with the live video feed;
select the favorite still image from the live video feed based on the one or more image characteristics;
receive user input from a user based on the selected favorite still image;
refine the machine learning model for the user based on the received user input in connection with one or more favorite still images selected by the machine learning model; and
apply the refined machine learning model to a new live video feed to select a new favorite still image based on the refined machine learning model.

21. The method of claim 1, further comprising: where the profile picture does not exist, uploading the profile picture before determining that one or more update criteria are met for the profile picture.

22. The method of claim 18, further comprising: where the profile picture does not exist, upload the profile picture before determining that one or more update criteria are met for the profile picture.

23. The method of claim 20, further comprising: where the profile picture does not exist, upload the profile picture before selecting the favorite still image from the live video feed based on the one or more image characteristics.

* * * * *